US005601367A

United States Patent [19]
Nara

[11] Patent Number: 5,601,367
[45] Date of Patent: Feb. 11, 1997

[54] TEMPERATURE SENSOR FOR SENSING TEMPERATURE IN A MAGNETIC FIELD

[75] Inventor: Koichi Nara, Tsukuba, Japan

[73] Assignee: Agency of Industrial Science & Technology, Ministry of International Trade & Industry, Tokyo, Japan

[21] Appl. No.: 403,959

[22] Filed: Mar. 14, 1995

[30] Foreign Application Priority Data

Mar. 18, 1994 [JP] Japan .................................. 6-074309

[51] Int. Cl.$^6$ .................................................. G01K 7/16
[52] U.S. Cl. ........................ 374/183; 374/165; 338/25; 338/320
[58] Field of Search ................... 324/693, 71.1; 374/135, 163, 165, 170, 183, 185; 338/25, 314, 319, 320

[56] References Cited

U.S. PATENT DOCUMENTS

| | | | |
|---|---|---|---|
| 3,598,136 | 8/1971 | Zaginailoff | 374/135 |
| 3,946,307 | 3/1976 | Mori et al. | 374/185 |
| 4,129,848 | 12/1978 | Frank et al. | 374/185 |
| 4,196,411 | 4/1980 | Kaufman | 338/320 |
| 4,436,438 | 3/1984 | Voznick | 374/165 |
| 4,506,996 | 3/1985 | Nara | 374/176 |
| 5,096,303 | 3/1992 | Jeziorowski | 374/183 |

*Primary Examiner*—G. Bradley Bennett
*Attorney, Agent, or Firm*—Oblon, Spivak, McClelland, Maier & Neustadt, P.C.

[57] ABSTRACT

A temperature sensor includes a first sensor section having first and second conductors connected at their one ends and defining macroscopic current paths directed in different directions with respect to that of a magnetic field and having resistance values such that the magnetic field produces identical changes in resistance therein, a similarly constituted second sensor section having third and fourth conductors connected to the second and first conductors, and heat coupling means for keeping the temperature of the first and second sensor sections uniform. The sensor measures the environmental temperature of the magnetic field from the voltage occurring between the connection point of the first and second conductors and the connection point of the third and fourth conductors when current is supplied to the first and second sensor sections through a current supply point at the connection point of the first and fourth conductors and a current supply point at the connection point of the second and third conductors.

7 Claims, 5 Drawing Sheets

TEMPERATURE SENSOR FOR SENSING TEMPERATURE IN A MAGNETIC FIELD

BACKGROUND OF THE INVENTION

1. Field of the Invention:

This invention relates to a temperature sensor using electrical conductors whose electrical resistance varies with temperature and more particularly to such a temperature sensor suitable for temperature measurement in a varying magnetic field.

2. Description of the Prior Art:

The recent advances in the development of superconducting magnets and the like have led to the use of strong magnetic fields in various disciplines. For ensuring safety and reducing energy consumption when using a superconducting magnet, it is important to monitor the temperature throughout the magnet. The thermometers used in the cryogenic environments in which superconducting magnets operate are generally temperature sensors utilizing the change in resistance of a conductor with change in temperature. Although deviations arise in the readings produced by temperature sensors of this type owing to the effect of the magnetic field on the conductor, it is in principle possible to correct individual temperature sensors for deviation by calibrating them in a static magnetic field. The measurement of temperature in a magnetic field has therefore been conducted by first ascertaining the correction value required for the temperature sensor in a magnetic field of known intensity and then using the correction value to correct the measured value to thereby determine the actual temperature in the environment concerned.

Since this method of temperature method requires the corrections to be carried out individually, however, it is troublesome and reduces the efficiency of the temperature measurement work. In addition, error introduced in the course of determining the correction value detracts from the measurement accuracy.

Moreover, the prior art temperature sensor cannot be used in the new fields of application that have developed as advances in superconducting technology have made it possible for superconducting magnets to produce magnetic fields that vary at several to several tens of Hz. This is because the resistance of the temperature sensor conductor varies synchronously with the frequency of the magnetic field, making it impossible to measure temperature accurately and to carry out the conventional correction.

It is therefore an object of the present invention to provide a temperature sensor which is hardly affected by magnetic field and is therefore capable of measuring temperature with high accuracy in a varying magnetic field.

SUMMARY OF THE INVENTION

For achieving the aforesaid object, this invention provides a temperature sensor comprising a first sensor section disposed in a substantially uniform magnetic field and including a first conductor having a macroscopic current path directed in a prescribed direction with respect to that of the magnetic field, a second conductor having a macroscopic current path directed in a direction different from that of the first conductor and a first voltage detection point at a connection point between the first conductor and the second conductor, resistance values of the first conductor and the second conductor being set such that the magnetic field produces identical changes in resistance in the first and second conductors; a second sensor section disposed in the same magnetic field as the first sensor section and including a third conductor having a macroscopic current path and a resistance value whose conditions are substantially identical with those of the first conductor, a fourth conductor having a macroscopic current path and a resistance value whose conditions are substantially identical with those of the second conductor and a second voltage detection point at a connection point between the third conductor and the fourth conductor; heat coupling means for imparting substantially uniform temperature to the first sensor section and the second sensor section; a first current supply point at a connection point between the first conductor of the first sensor section and the fourth conductor of the second sensor section; and a second current supply point at a connection point between the second conductor of the first sensor section and the third conductor of the second sensor section; environmental temperature of the magnetic field being measured based on a voltage occurring between the first voltage detection point of the first sensor section and the second voltage point of the second sensor section when current is supplied to the first sensor section and the second sensor section through the first current supply point and the second supply point.

When the temperature sensor according to the present invention is in a magnetic field in which temperature is to be measured, the changes in the resistances of the first conductor of the first sensor section and the fourth conductor of the second sensor section are substantially equal and the changes in the resistances of the second conductor of the first sensor section and the third conductor of the second sensor section are also substantially equal. As a result, the changes in resistance caused by changes in the magnetic field intensity automatically cancel each other so that the difference in voltage arising between the first voltage detection point and the second voltage detection point is solely dependent on temperature. This makes it possible to measure temperature with high accuracy-even in a varying magnetic field.

The above and other objects, characteristic features and advantages of this invention will become apparent to those skilled in the art from the description of the invention given hereinbelow with reference to the accompanying drawings.

DESCRIPTION OF THE PREFERRED EMBODIMENTS

The principle of the temperature sensor according to the invention will first be explained with reference to FIGS. 1 to 3.

The resistance R of a conductor in a magnetic field H can be calculated from the resistance $R_0$ in a zero magnetic field as $$R = R_0(1+\epsilon) \quad (1)$$

where $\epsilon$ is the relative magnetoresistance ratio (the ratio of the change in the resistance of a conductor caused by the effect of a magnetic field when the resistance value of the conductor in zero magnetic field is defined as 1) and is dependent on temperature T, magnetic field H and angle $\theta$ between the current and the magnetic field. Moreover, the dependence thereof differs with the type of temperature-sensing material.

In the case of platinum, a typical temperature-sensing material, the following two points are known regarding the relationship between relative magnetoresistance ratio and the anisotropy thereof. (1) $\epsilon$ assumes the maximum value $\epsilon\perp$ when the angle between the current and the magnetic field is 90° and the minimum value $\epsilon\|$ when the current is parallel to the magnetic field. (2) The ratio $\epsilon\|/\epsilon\perp$ is about 30% when precisely measured for a thin wire and the temperature dependence thereof is not very large.

This is substantiated by the fact that in an actual commercial thin-film temperature sensor (PTF-7 produced by Hycal Engineering, USA) it was found that the effect of magnetic field is minimum when the direction of the main component of the current flowing through the thin-film wiring pattern (hereinafter called the macroscopic direction) is parallel to the magnetic field and is maximum when it is perpendicular thereto (i.e. when the magnetic field and the thin films are oriented to be precisely perpendicular).

Figure 1:
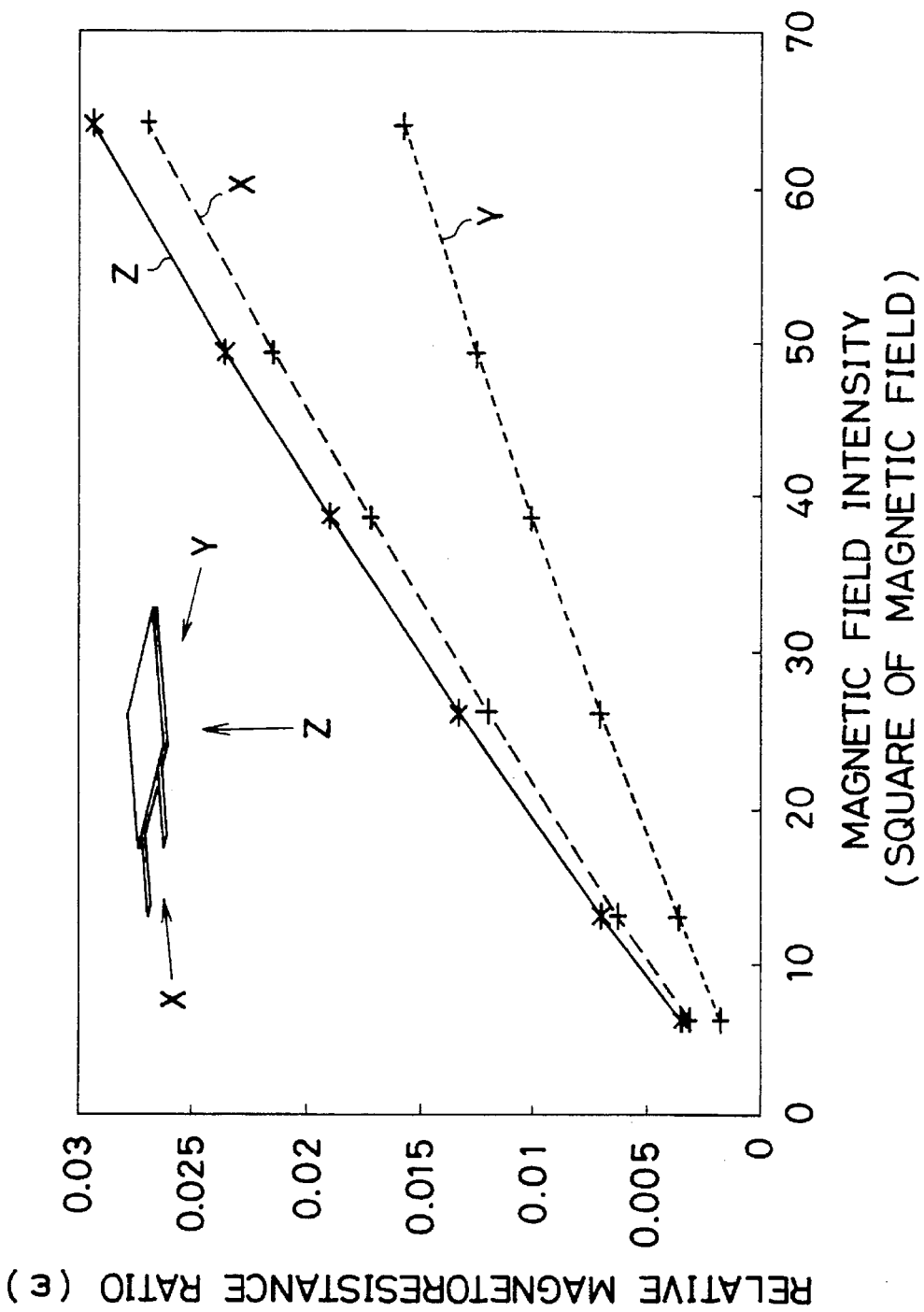
FIG. 1 is a graph showing the anisotropic characteristics of the magnetoresistance effect of a commercial thin-film temperature sensor at 40 K.

FIG. 1 shows an example of the results obtained when the magnetic field effect anistropy was measured in a temperature environment of about 40 K. The graph shows relative magnetoresistance ratio ($\epsilon$) as a function of magnetic field intensity (square of the magnetic field) when the magnetic field was in the X, Y and Z directions relative to the film surface of the thin-film sensor. In this example, the ratio between the minimum and maximum relative magnetoresistance ratios is approximately 0.5. The macroscopic current direction in the thin-film sensor is approximately parallel to the Y direction and, therefore, in the graph of FIG. 1 the relative magnetoresistance ratio is smallest when the magnetic field is applied in the Y direction and is higher when the magnetic field is applied in the X and Z directions. The reason for the relative magnetoresistance ratio being somewhat lower for a magnetic field applied in the X direction than for one applied in the Z direction is that the circuit pattern of the thin-film sensor includes a current path in the X direction.

Use of such thin-film sensors or other anisotropic conductors makes it possible to cancel the effect of the magnetic field. The principle involved will now be explained with reference to FIG. 2.

A first sensor section 1 is constituted of a first conductor 1a forming a current path substantially parallel to the direction of the magnetic field H, a second conductor 1b having substantially the same resistance as the first conductor 1a and lying substantially perpendicular to the direction of the magnetic field H to form a current path perpendicular to the first conductor 1a and a first voltage detection point 1c between the first conductor 1a and the second conductor 1b. A second sensor section 2 is constituted of a third conductor 2a provided under substantially the same conditions as the first conductor 1a (disposed parallel to the direction of the magnetic field H and having the same resistance), a fourth conductor 2b provided under substantially the same conditions as the second conductor 1b (disposed perpendicular to the direction of the magnetic field H and having the same resistance) and a second voltage detection point 2c between the third conductor 2a and the fourth conductor 2b. The first sensor section 1 and second sensor section 2 are heat coupled by a sapphire, alumina or other such substrate (not shown) so as to be maintained at a substantially uniform temperature (the measurement environment temperature). The voltage at the first voltage detection point 1c is obtained through a first measurement terminal 4a and the voltage at the second voltage detection point 2c is obtained through a second measurement terminal 4b.

By way of example, consideration will be given to the case where direct current is passed by making the voltage at a first current supply terminal 3a connected to the first conductor 1a of the first sensor section 1 and the fourth conductor 2b of the second sensor section 2 high and making the voltage at a second current supply terminal 3b connected to the second conductor 1b of the first sensor section 1 and the third conductor 2a of the second sensor section 2 low. The orientation of the first conductor 1a and the third conductor 2a is such that they have relative magnetoresistance ratios of minimum value $\epsilon_{MIN}$ and the orientation of the second conductor 1b and the fourth conductor 2b are such that they have relative magnetoresistance ratio of maximum value $\epsilon_{MAX}$. The ratio between $\epsilon_{MIN}$ and $\epsilon_{MAX}$ is defined as $\delta$. Specifically, $$\delta = \epsilon_{MIN}/\epsilon_{MAX} \quad (2)$$

Although strictly speaking the ratio $\delta$ is complexly dependent on temperature and magnetic field, its dependence thereon is not large.

Using Equation (2), the resistance of the first to fourth conductors 1a, 1b, 2a, 2b are set according to Equation (3) below. Since the values set in this way hold over the entire temperature range insofar as the same material is used, they can, for example, be set under the environment in which measurement of temperature or the like is easiest. For utmost prevention of the introduction of minute error, however, it is preferable for the setting to be made using the value of $\delta$ at the temperature desired to be defined as zero. Since $\delta$ is about 0.3 when thin platinum wires are used as the conductors, it suffices to establish the relationship "Resistance of first and third conductors 1a, 2a: Resistance of second and fourth conductors 1b, 2b=10:3". If this is achieved by using lines of the same diameter but of different length, the longitudinal lines will have a length of 10 against a length of 3 for the lateral lines, as shown in FIG. 2.

$$R_{MIN} = R_{MAX}/\delta \quad (3)$$

In this equation, the resistance is small at the portion $R_{MAX}$ where the effect of the magnetic field is large and is large at the portion $R_{MIN}$ where the effect of the magnetic field is small.

Figure 3:
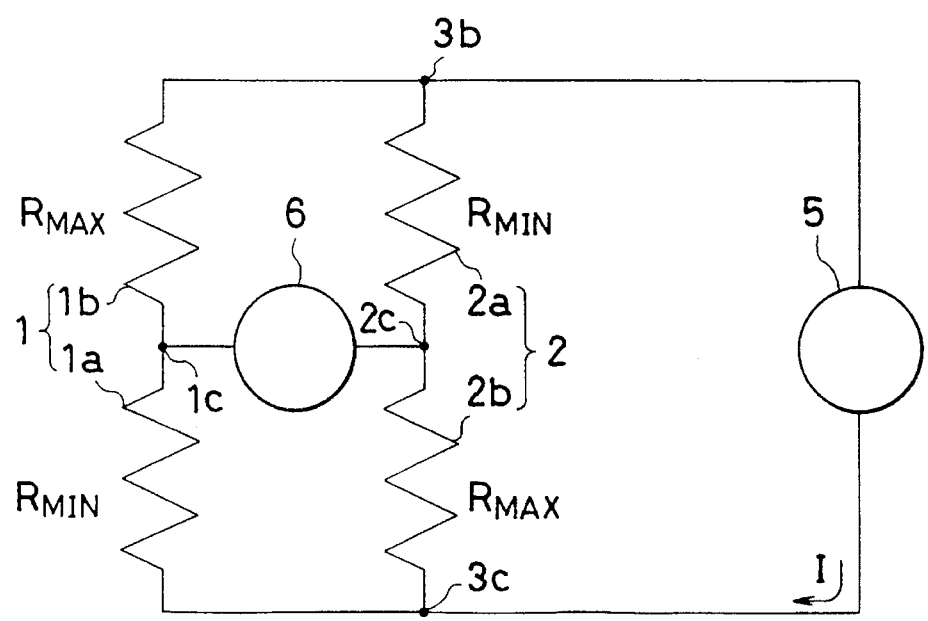
FIG. 3 is diagram of the circuit in which the invention temperature sensor is used.

FIG. 3 shows the first and second sensor sections 1, 2 connected to an external circuit including a voltmeter 6 for measuring the voltage V occurring between the first and second voltage detection points $1c$, $2c$ when a current I is passed through the first and second sensor sections 1, 2 by a constant current source 5. Defining the effective resistance $R_{eff}$ of this circuit as V/I, it holds that $$R_{eff}=(R_{MIN}-R_{MAX})/2 \quad (4)$$

Substituting in the relative magnetoresistance ratios of the conductors, the change $\Delta R_{eff}$ in $R_{eff}$ in the magnetic field is obtained as $$\begin{aligned}\Delta R_{eff} &= (R_{MIN} \times \epsilon_{MIN} - R_{MAX} \times \epsilon_{MAX})/2 \quad (5)\\ &= \epsilon_{MAX}(R_{MIN} \times \delta - R_{MAX})/2 \\ &= 0\end{aligned}$$

Thus the effective change in resistance produced by the magnetic field is zero, i.e., the sensor is unaffected by the magnetic field. Moreover, as is clear from Equation (4), the relative sensitivity of the sensor as a temperature sensor, namely, (dR/dT)/R, does not change from that of the temperature-sensing material, meaning that there is no loss of characteristics as a temperature sensor. In other words, once its effective resistance has been calibrated against temperature in zero magnetic field, the temperature sensor according to this invention can be used in a magnetic field without further correction. It therefore greatly increases the reliability of temperature measurement in a varying magnetic field. (The resistance value obtained in the foregoing manner is converted to a temperature value with reference to a data table (resistance in zero magnetic field—temperature characteristic) specific to the temperature sensor fabricated from the type of temperature-sensing material concerned.)

Figure 2:
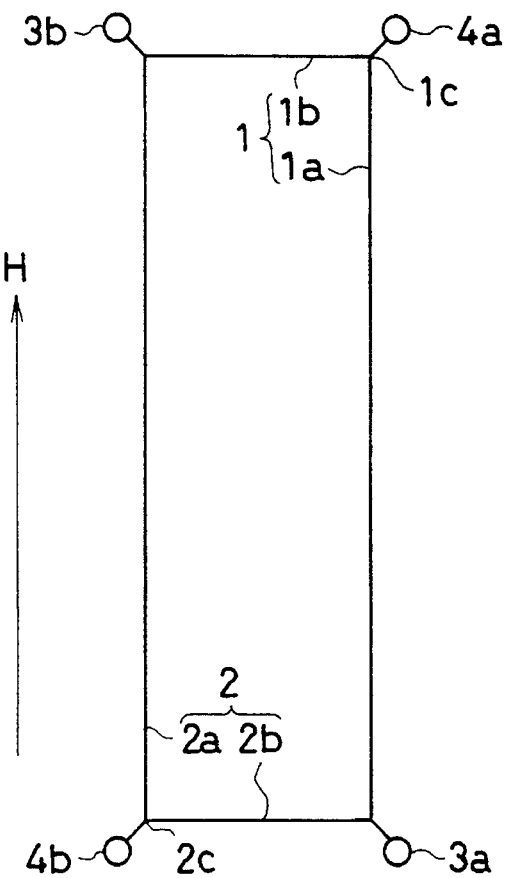
FIG. 2 is a schematic view showing the basic principle of the temperature sensor of the invention.

The current paths constituted by the first to fourth conductors $1a$, $1b$, $2a$, $2b$ forming the first sensor section 1 and the second sensor section 2 are not limited to the straight thin-wire pattern shown in FIG. 2 and other patterns are also usable insofar as they provide macroscopic current paths in specified directions. Thus the presence of current path segments which run in directions different from the specified directions, such as found in commercial thin-film temperature sensors, do not cause a problem in practical application.

The direction of the first and third conductors $1a$, $2a$ and direction of the second and fourth conductors $1b$, $2b$ are not limited to those in which the magnetoresistance effect (the phenomenon of the resistance of a conductor changing with magnetic field) is minimum and maximum and, moreover, the conductors of the respective sensor sections do not necessarily have to be perpendicular to each other. For example, the relative magnetoresistance ratios of the first and second conductors $1a$, $2a$ and the second and fourth conductors $1b$ can be set at appropriate values $\epsilon_{midH}$ and $\epsilon_{midL}$ between $\epsilon_{MAX}$ and $\epsilon_{MIN}$ (provided that $\epsilon_{midH} \neq \epsilon_{midL}$) and the resistance ratio be adjusted to satisfy the condition of Equation (3). Since the voltage difference between the first and second voltage detection points $1c$, $2c$ produced by a given change in temperature increases in proportion to the difference between the resistances, however, it is preferable from the point of enhancing measurement accuracy to set the relative magnetoresistance ratios at $\epsilon_{MAX}$ and $\epsilon_{MIN}$.

As explained in the foregoing, it is in principle possible to measure temperature in a magnetic field unaffected by the magnetoresistance effect by establishing two current paths making different angles with respect to the magnetic field. Consideration will now be given to what conditions must be met to obtain a practically useful temperature sensor of this type.

The anisotropy of the relative magnetoresistance ratio $\epsilon$ is dependent on the angle $\theta$ between the current and the magnetic field, the relative magnetoresistance ratio reaching its maximum value $\epsilon_{MAX}$ when the current and the magnetic field are perpendicular to each other. It is known that when a platinum conductor and a magnetic field make an angle $\theta$, the relative magnetoresistance ratio satisfies the following condition over a wide range.

$$\epsilon\theta/\epsilon_{MAX}=0.3+0.7(\sin\theta)^2 \quad (6)$$

From this equation it is clear that the relative magnetoresistance ratio at angle $\theta$ approaches $0.3 \times \epsilon_{MAX}$ (minimum value) and the difference between it and the maximum relative magnetoresistance ratio $\epsilon_{MAX}$ grows larger as $\theta$ approaches zero (with increasing parallelism to the magnetic field). In the temperature sensor according to this invention, moreover, $\epsilon_{midH}$ ($\epsilon_{MAX}$ when $\theta=90°$) and $\epsilon_{midL}$ ($\epsilon_{MIN}$ when $\theta=0°$) are determined by the angle between the current paths constituted by two conductors and a voltage output is obtained in proportion to the difference between the two relative magnetoresistance ratios. It is therefore not absolutely necessary for either of the conductors to be oriented so as to maximize or minimize the relative magnetoresistance ratio. However, since orienting one of the conductors so as to maximize or minimize the relative magnetoresistance ratio facilitates the positional adjustment of the conductor in the magnetic field, it is advantageous from the practical viewpoint. Configurations capable of functioning as practical temperature sensors will therefore be explained for the case where one of the conductors is oriented for maximizing the relative magnetoresistance ratio and for the case where one of the conductors is oriented for minimizing the relative magnetoresistance ratio.

The ratio between the resistances of the conductors of the respective sensor sections required for realizing a temperature sensor with practical measurement accuracy is assumed to be around 2:3. In the case where the relative magnetoresistance ratio of one of the conductors is $\epsilon_{MAX}$, i.e., when $\theta_H$ is 90°, it is preferable for the angle $\theta_L$ between the macroscopic current path of the other conductor and the magnetic field to be not more than 45°. In the case where the relative magnetoresistance ratio of one of the conductors is $\epsilon_{MIN}$, i.e., when $\theta_L$ is 0°, it is preferable for the angle $\theta_H$ between the macroscopic current path of the other conductor and the magnetic field to be not less than 30°.

The current source for supplying current to the first and second current supply terminals $3a$, $3b$ does not have to be a constant current source. It is instead possible to use an alternating current source, ascertain the effective voltage and the effective current, calculate the effective resistance, and determine the environmental temperature from the so-determined effective resistance. Use of a direct current source is, however, preferable from the viewpoint of circuit simplification and measurement accuracy.

The temperature-sensing material used as the conductor is not limited to platinum and it is possible to select the type of material providing the best sensitivity for the temperature range concerned. While platinum is an extremely useful temperature-sensing material in cryogenic environments in the temperature range of liquid nitrogen, other materials such as platinum-cobalt and rhodium-iron also exhibit excellent temperature-sensing property in cryogenic environments.

Specific temperature sensor embodiments fabricated in accordance with the principle of this invention will now be explained.

Figure 4:
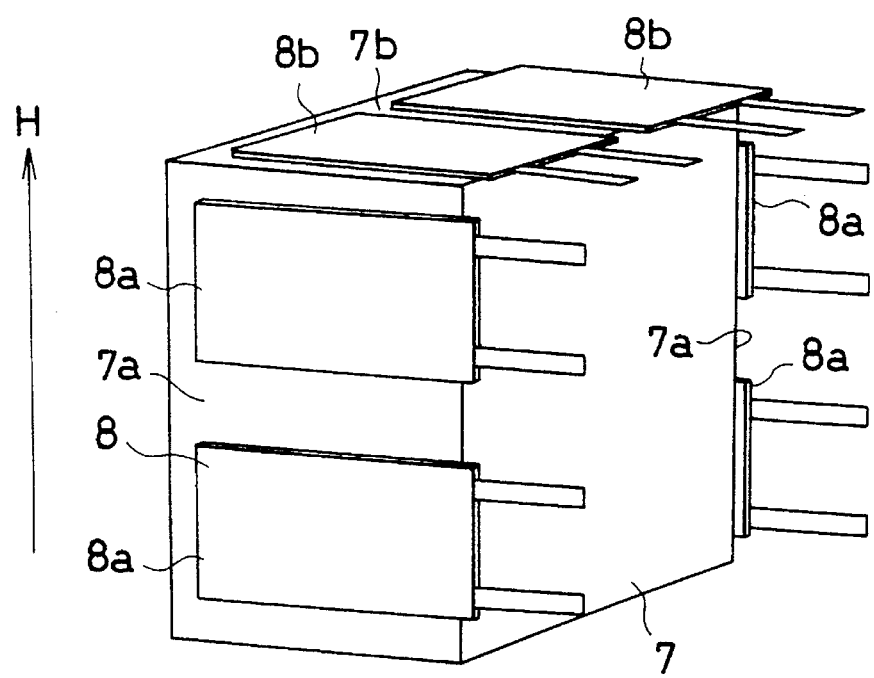
FIG. 4 is diagram showing the three-dimensional configuration of a temperature sensor that is a first embodiment of the invention.

FIG. 4 shows an embodiment of a temperature sensor that is an embodiment of this invention fabricated by bonding two commercial thin-film temperature sensors to each of three sides of a uniform temperature block 7 made of copper. The thin-film temperature sensors 8a, 8b attached to the uniform temperature block 7 exhibit the relationship between magnetic field effect and anisotropy explained earlier with reference to FIG. 1. Two surfaces 7a of the uniform temperature block 7 lying parallel to the direction of a magnetic field H each have bonded thereto two thin-film temperature sensors 8a which provide macroscopic current paths parallel to the direction of the magnetic field H and one surface 7b of the uniform temperature block 7 lying perpendicularly to the direction of the magnetic field H has bonded thereto two thin-film temperature sensors 8b. In other words, since it is known from the results shown in FIG. 1 that the value of $\delta$ in Equation 2 is about 0.5 and it therefore holds that $R_{MIN}=2R_{MAX}$, two thin-film temperature sensors 8a, 8a are connected in series to form each of the first and second conductors 1a, 2a.

The uniform temperature block 7 to which the thin-film temperature sensors 8a, 8b are attached need not necessarily be made of copper but can be made of any material with good thermal conductivity. Moreover, it does not necessarily have to have the block-like shape shown in the figure. The only requirements are that it enable the macroscopic current paths formed by the first and third conductors 1a, 2a and the macroscopic current paths formed by the second and fourth conductors 1b, 2b to be established in different directions with respect to the magnetic field direction and that it be capable of maintaining an approximately uniform temperature environment for the first to fourth conductors 1a, 1b, 2a, 2b.

Figure 5:
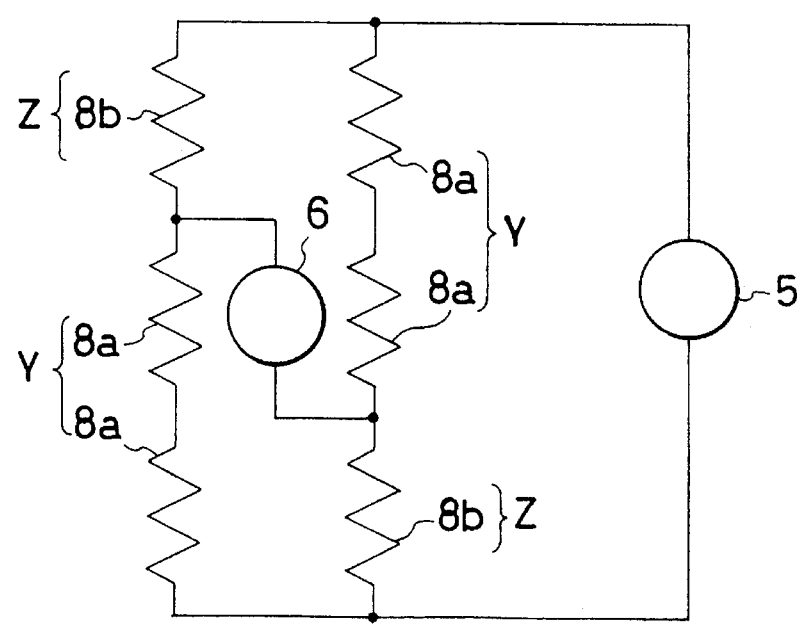
FIG. 5 is diagram of the circuit in which the temperature sensor of FIG. 4 is used.
Figure 6:
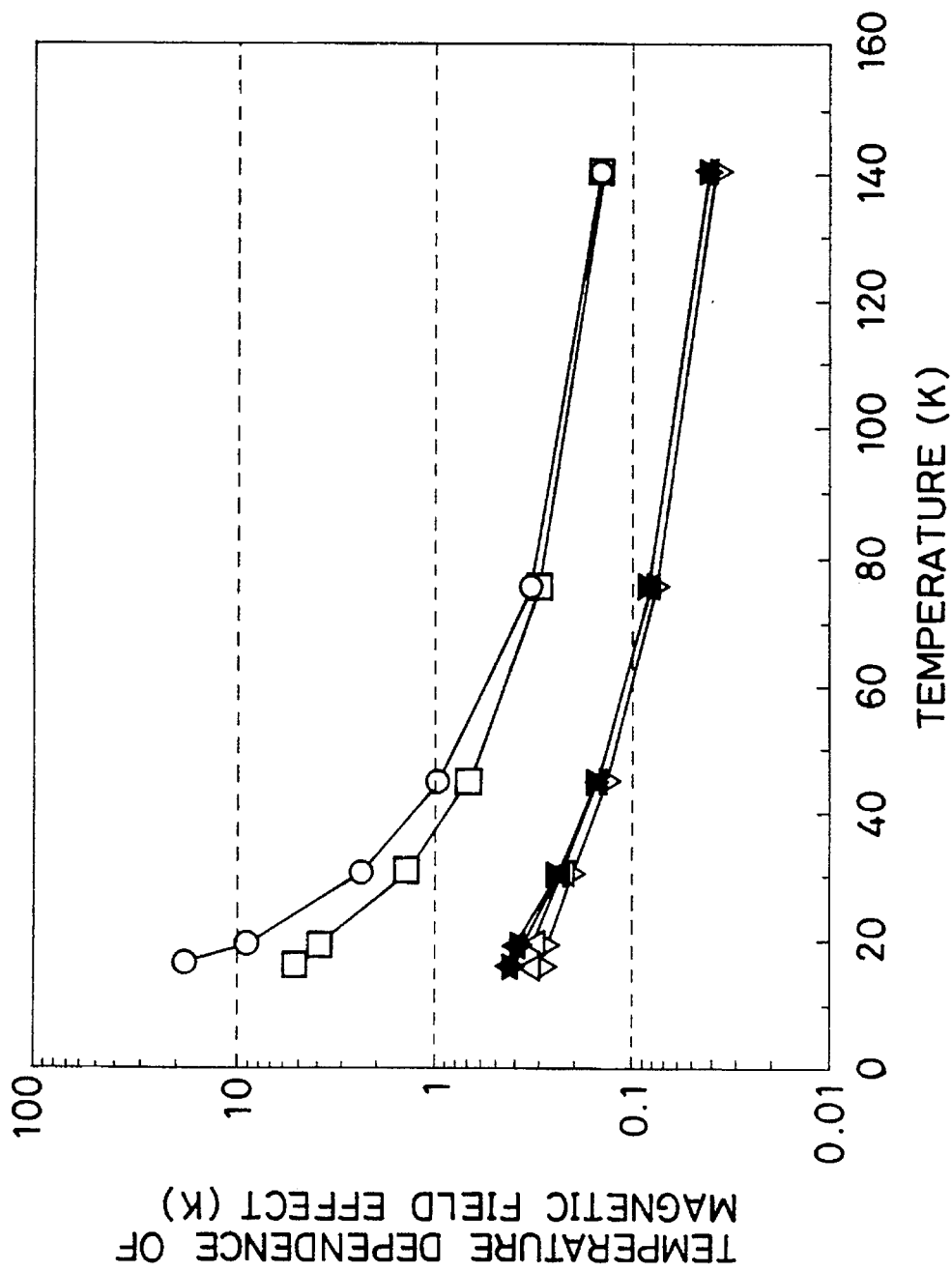
FIG. 6 is a graph showing the temperature dependence of the effect of magnetic field on different types of temperature sensors in a 8 T static magnetic field.

The block-shaped temperature sensor constituted in the foregoing manner was incorporated in a circuit configured as shown in FIG. 5 and used for temperature measurement in an 8 T (Tesla) magnetic field. FIG. 6 shows the results obtained when the temperature dependence of the magnetic field effect was measured. The measurement was conducted with the direction of the magnetic field H parallel to the Y axis of an X-Y-Z coordinate system (in the vertical direction in the perspective view of FIG. 4), the macroscopic current paths of the thin-film temperature sensors 8a parallel to the Y axis, and the macroscopic current paths of the thin-film temperature sensors 8b parallel to the Z axis (in the direction from left front to the right back in the perspective view of FIG. 4). For investigating how greatly the solid body used to fabricate the temperature sensor affects the measurement results, four temperature sensors (Nos. 1 to 4) were fabricated under identical conditions. The results for No. 1 are indicated by Δ, for No. 2 by ▲, for No. 3 by ∇, and for No. 4 by ▼.

For comparison, a commercial temperature sensor using a platinum wire and a commercial temperature sensor using a platinum thin film were used for temperature measurement in an 8 T (Tesla) magnetic field. The results for the former sensor are indicated by the symbol ◊ in FIG. 6 and those for the latter are indicated by the symbol □ in the same figure.

As is clear from FIG. 6, the measurement errors of the four temperature sensors according to the first embodiment of the invention amounted to only between one and a few tenths that of the measurement error included in the temperature values of the two types of commercial platinum temperature sensors. The difference was particularly pronounced in the 20-30 K temperature region, where the measurement error of the commercial platinum sensors was very high while the temperature sensor according to the first embodiment continued to give adequately accurate readings, validating the effectiveness of the invention.

Thus the first embodiment of the temperature sensor according to this invention is little affected (is in principle unaffected) by the magnetoresistance effect of magnetic fields and, therefore, is unaffected not only in a static magnetic field but also in a varying magnetic field in which no difference arises between the amount of resistance change the magnetic field produces in the first and third conductors 1a, 2a and the amount of resistance change the magnetic field produces in the second and fourth conductors 1b, 2b. The first embodiment of the temperature sensor is thus unaffected by the magnetoresistance effect even in a varying magnetic field produced by, for example, varying the magnetic field intensity without changing the direction of the magnetic field H from that shown in FIG. 2 or by maintaining the same intensity but reversing the direction of the magnetic field. Moreover, if the foregoing embodiment is designed so that the relative magnetoresistance ratio arising in the first and third conductors 1a, 2a is $\epsilon_{MIN}$, it will remain totally unaffected by the magnetic field even when moved within the magnetic field so long as the movement is such that the first and third conductors 1a, 2a are translated parallel to the direction of the magnetic field H.

While it was demonstrated in the foregoing that the temperature sensor according to the invention is by its principle of operation immune to the magnetoresistance effect, the effect of the magnetic field was in fact relative large. This can be attributed to the use of commercial thin-film temperature sensors for constituting the first to fourth conductors. It is therefore possible further reduce the effect of the magnetic field through high-accuracy adjustment of the resistances of the first to fourth conductors. This in turn makes it possible to provide a general-purpose temperature sensor by defining the direction in which the conductors are to be disposed relative to the direction of the magnetic field in advance and disposing the temperature sensor having first to forth conductors with highly accurate resistances under these conditions in a magnetic field so as to satisfy prescribed conditions.

Figure 7:
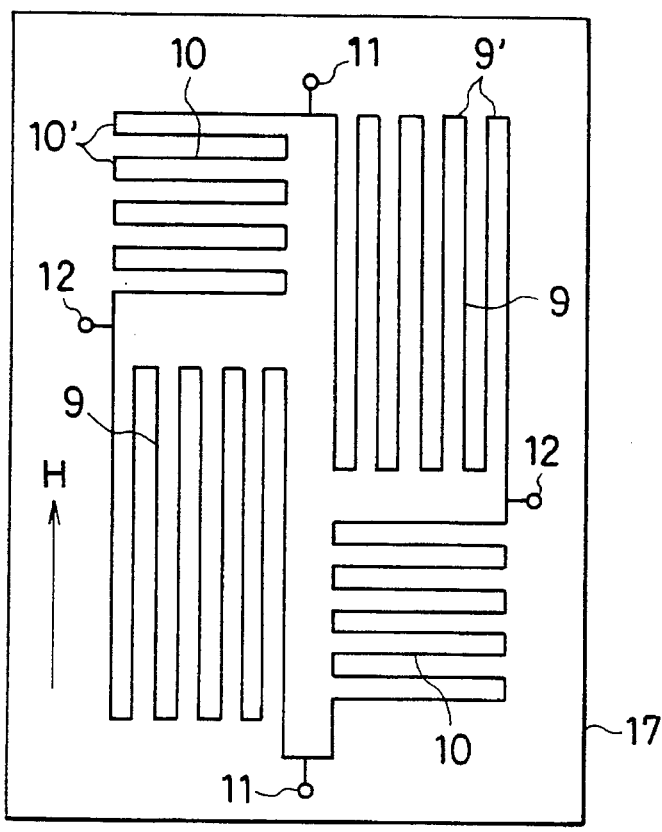
FIG. 7 is a circuit diagram of a temperature sensor that is a second embodiment of the invention.

FIG. 7 shows a practical configuration for use in fabricating such a general-purpose temperature sensor, wherein the wiring is formed of conductive thin film on a non-conductive substrate 17 serving as the heat coupling means. Specifically, the plate-like temperature sensor according to the second embodiment of the invention has a pair of first current patterns 9, 9 forming current paths that are macroscopically parallel to the direction of the magnetic field H directed parallel to the plate surface, a pair of second current patterns 10, 10 forming current paths that are macroscopically perpendicular to the direction of the magnetic field H, current supply terminals 11, 11 located at the connection points between the first current patterns 9, 9 and the second current patterns 10, 10, and voltage measurement terminals 12, 12. The first current patterns 9, 9 are at portions with a small relative magnetoresistance ratio and .are therefore formed to have large resistance values, while the second current patterns 10, 10 are at portions with a large relative magnetoresistance ratio and are therefore formed to have small resistance values. This wiring is equivalent to that obtained by combining the Y and X direction results of FIG. 1. This configuration of the second embodiment as an integrated thin-film sensor formed on a single surface is preferable from the aspects of size reduction and ease of mass production.

Although in this second embodiment the first and second current patterns 9, 10 include reverse current path segments 9'. . . , 10'. . . running perpendicular to the macroscopic current paths, it suffices to design the circuit so that the resistance values of the reverse current path segments 9', 10' in the magnetic field cancel each other. In the case that platinum is used as the conductive material, for example, $\delta=0.3$, so that good correction of the resistance values of the reverse current path segments can be achieved by establishing the relationship "Current path length of reverse current path segment 9': Current path length of reverse current path segment 10'=0.3:1". Although in the description of the earlier embodiment only adjustment of the current path length was mentioned as an example of how the resistance can be adjusted, it is also possible to adjust the resistance by increasing or decreasing the current path width or the film thickness.

Figure 8:
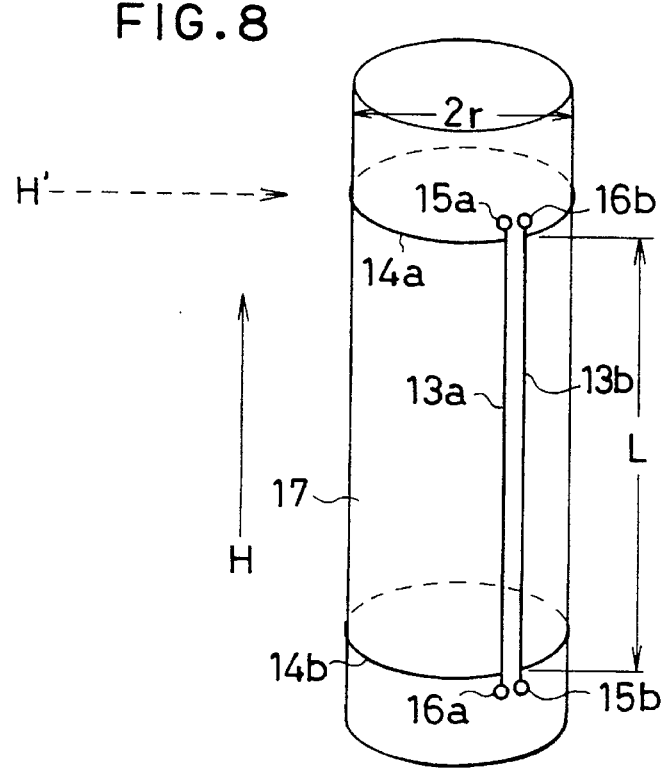
FIG. 8 is a circuit diagram of a temperature sensor that is a third embodiment of the invention.

FIG. 8 shows a third embodiment of the temperature sensor according to this invention constituted of two straight thin wires 13a, 13b made of platinum or other conductive wire and disposed parallel to the direction of the magnetic field H and two thin-wire loops 14a, 14b provided at the top and bottom ends of the thin wires 13a, 13b and disposed in planes perpendicular to the magnetic field H. In this embodiment, the first sensor section is constituted by the straight thin wire 13a as the first conductor, the thin-wire loop 14a as the second conductor, a first voltage detection point at the connection point between these two thin wires, and a voltage measurement terminal 15a. Similarly, the second sensor section is constituted by the straight thin wire 13b as the third conductor, the thin-wire loop 14b as the fourth conductor, a second voltage detection point at the connection point between these two thin wires, and a voltage measurement terminal 15b. The connection point between the straight thin wire 13a and one thin-wire loop is the first current supply point and is provided with a current supply terminal 16a. The connection point between the straight thin wire 13b and the other thin-wire loop is the second supply point and is provided with a current supply terminal 16b. The thin-wire loops disposed to be perpendicular to the magnetic field (and having a relative magnetoresistance ratio of $\epsilon_{MAX}$) need only be positioned in planes lying perpendicular to the magnetic field and do not necessarily have to be positioned in the same plane in the portion parallel to the magnetic field. The temperature sensor of this embodiment is formed by winding fine wire on the outside of a cylindrical body 17 made of an electrical insulator, in line with the common practice of configuring thin-wire sensors by winding a temperature-sensing material (heat coupling means) on a glass core. In the case of using platinum wire and aligning the axis of the cylinder parallel to the direction of the magnetic field, it was found from the results of magnetoresistance effect tests that for eliminating the effect of the magnetic field it is necessary to satisfy the condition "L: $2\pi r=1:0.3$", where L is the length of the straight thin wires and r is the radius of the thin-wire loops.

The third embodiment of the sensor can be also be used with the direction of the magnetic field rotated by 90° as indicated by the dashed arrow H' in FIG. 8. Although in this case the thin-wire loops 14a, 14b include a mixture of portions lying parallel, oblique and perpendicular with respect to the direction of the magnetic field H', the effective relative magnetoresistance ratio is that obtained by summing the individual relative magnetoresistance ratios and calculating their arithmetic average. In the case of platinum, since the ratio relative to the magnetoresistance effect of the straight thin wires 13a, 13b is about 0.65, the effect of the magnetic field can be canceled by setting L and r such that "L: $2\pi r=0.65:1$".

In the third embodiment of the temperature sensor, the effect of the magnetic field can be canceled insofar as the planes of the thin-wire loops 14a, 14b lie parallel to the direction of the magnetic field H'. The temperature sensor can therefore be used for high-accuracy, real-time temperature measurement of a rotating body such as a rotating coil by disposing it on the rotating body with the thin-wire loops lying in planes parallel to the direction of the magnetic field.

In the fabrication of temperature sensors using thin-wire conductors it is a common practice to obtain the required resistances by winding the temperature-sensing material into a coil. In this case it suffices to adopt a design which ensures that the ratio between the loop portions and the overall length satisfies the foregoing equation. If it should be difficult to form the first wires to be completely straight, it is possible instead to wind the thin wires at a fairly large pitch width. In this case, however, since the relative magnetoresistance ratio per unit length differs from that of perfectly straight wires, it becomes necessary to compensate for the difference in cases where high-accuracy temperature measurement is required.

The foregoing embodiments were explained with respect to cases in which the heat coupling means is the substrate, block or rod on which the first and second sensor sections are formed. It is also possible, however, for the first and second sensor sections to be enclosed in a capsule or cylinder serving as the heat coupling means.

As explained in the foregoing, in accordance with the temperature sensor of the present invention the changes in resistance produced in the first and second sensor sections owing to the effect of the magnetic field can be made to cancel each other by selecting the resistance values exhibited by the first to fourth conductors in the magnetic field. As a result, there can be obtained a temperature sensor that is little affected by external magnetic fields and is thus able to provided enhanced measurement accuracy. In addition, the temperature sensor according to the invention is unaffected and does not suffer any degradation in measurement accuracy when used in varying magnetic fields in which no difference arises between the amount of resistance change the magnetic field produces in the first and third conductors and the amount of resistance change the magnetic field produces in the second and fourth conductors. Since the temperature sensor is therefore able to provide high-accuracy temperature measurement not only in a static magnetic field but also in a varying magnetic field, it has extremely high utility.

What is claimed is:

1. A temperature sensor comprising a first sensor section disposed in a substantially uniform magnetic field and including a first conductor having a macroscopic current path directed in a prescribed direction with respect to that of the magnetic field, a second conductor having a macroscopic current path directed in a direction different from that of the first conductor and a first voltage detection point at a connection point between the first conductor and the second conductor, resistance values of the first conductor and the second conductor being set such that the magnetic field produces identical changes in resistance in the first and second conductors, a second sensor section disposed in the same magnetic field as the first sensor section and including a third conductor having a macroscopic current path and a resistance value whose conditions are substantially identical with those of the first conductor, a fourth conductor having a macroscopic current path and a resistance value whose conditions are substantially identical with those of the second conductor and a second voltage detection point at a connection point between the third conductor and the fourth conductor, heat coupling means for imparting substantially uniform temperature to the first sensor section and the second sensor section, a first current supply point at a connection point between the first conductor of the first sensor section and the fourth conductor of the second sensor section, and a second current supply point at a connection point between the second conductor of the first sensor section and the third conductor of the second sensor section, environmental temperature of the magnetic field being measured based on a voltage occurring between the first voltage detection point of the first sensor section and the second voltage point of the second sensor section when current is supplied to the first sensor section and the second sensor section through the first current supply point and the second supply point.

2. A temperature sensor according to claim 1, wherein the first to fourth conductors are formed on a non-conductive substrate as a current path circuit pattern constituted of conductive thin film.

3. A temperature sensor according to claim 1, wherein the first conductor of the first sensor section and the third conductor of the second sensor section are disposed to minimize their magnetic field-induced relative magnetoresistance ratios and the second conductor of the first sensor section and the fourth conductor of the second sensor are disposed to maximize their magnetic field-induced relative magnetoresistance ratios.

4. A temperature sensor according to claim 2, wherein the first conductor of the first sensor section and the third conductor of the second sensor section are disposed to minimize their magnetic field-induced relative magnetoresistance ratios and the second conductor of the first sensor section and the fourth conductor of the second sensor are disposed to maximize their magnetic field-induced relative magnetoresistance ratios.

5. A temperature sensor according to claim 1, wherein the first conductor of the first sensor section is a straight thin wire, the second conductor thereof is a thin-wire loop disposed perpendicular to said straight thin wire, the third conductor of the second sensor section is a straight thin wire disposed parallel to said straight thin wire, and the fourth conductor thereof is a thin-wire loop disposed perpendicular to said straight thin wire constituting said third conductor.

6. A temperature sensor according to claim 1, wherein the heat coupling means is a plate member constituted of a material with good thermal conductivity and formed to have a flat surface for attachment of conductors.

7. A temperature sensor according to claim 1, wherein the heat coupling means is a block member constituted of a material with good thermal conductivity and formed to have two or more nonparallel surfaces for attachment of conductors.

* * * * *